United States Patent
Ng

(10) Patent No.: US 8,333,661 B2
(45) Date of Patent: Dec. 18, 2012

(54) GAMING SYSTEM WITH SAFTEY FEATURES

(75) Inventor: Choo Boon Ng, Penang (MY)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 13/048,220

(22) Filed: Mar. 15, 2011

(65) Prior Publication Data

US 2011/0230263 A1    Sep. 22, 2011

(30) Foreign Application Priority Data

Mar. 16, 2010    (MY) ............................ PI 2010001152

(51) Int. Cl.
  *G06F 17/00*    (2006.01)
(52) U.S. Cl. ........................................................ 463/31
(58) Field of Classification Search .............. 463/16–25, 463/30–36, 39, 42
  See application file for complete search history.

(56) References Cited

U.S. PATENT DOCUMENTS

| 7,774,155 | B2 * | 8/2010 | Sato et al. ................... | 702/127 |
| 2010/0303289 | A1 * | 12/2010 | Polzin et al. ................. | 382/103 |
| 2011/0043630 | A1 * | 2/2011 | McClure et al. .............. | 348/143 |
| 2012/0051588 | A1 * | 3/2012 | McEldowney .................. | 382/103 |
| 2012/0056800 | A1 * | 3/2012 | Williams et al. .............. | 345/156 |

* cited by examiner

*Primary Examiner* — Ronald Laneau
(74) *Attorney, Agent, or Firm* — Ryder, Lu, Mazzeo and Konieczny, LLC; Douglas J. Ryder

(57) ABSTRACT

A gaming console may provide safety features that may avoid or minimize the probability of a collision between the user of the gaming console and the surrounding objects while the user is playing a game. The gaming console may include body sensors to continuously track and capture images of the full body movement of the user. The gaming console may comprise proximity sensors, which may scan and capture the images of the surrounding objects at regular intervals of time. The gaming console may use the images of the full body movement and the images of the surrounding objects to determine if the user is close to the surrounding objects, which may cause collision with the surrounding objects. If the user is close to the surrounding objects, the gaming console may generate alert signals that may avoid or minimize the probability of collision of the user with the surrounding objects.

20 Claims, 3 Drawing Sheets

GAMING SYSTEM WITH SAFTEY FEATURES

CROSS-REFERENCE TO RELATED APPLICATIONS

This application claims priority to Malaysian Patent Application No. PI 2010001152, filed Mar. 16, 2010, the entire contents of which are hereby incorporated by reference herein.

BACKGROUND

New generation of gaming systems support remote control-less consoles. The new generation gaming systems support features that detect and respond to motion and emotion of the users of the gaming system. However, the new generation gaming systems lack safety features, which may provide an opportunity to the users to avoid being injured caused by inadvertently colliding with the surrounding objects.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
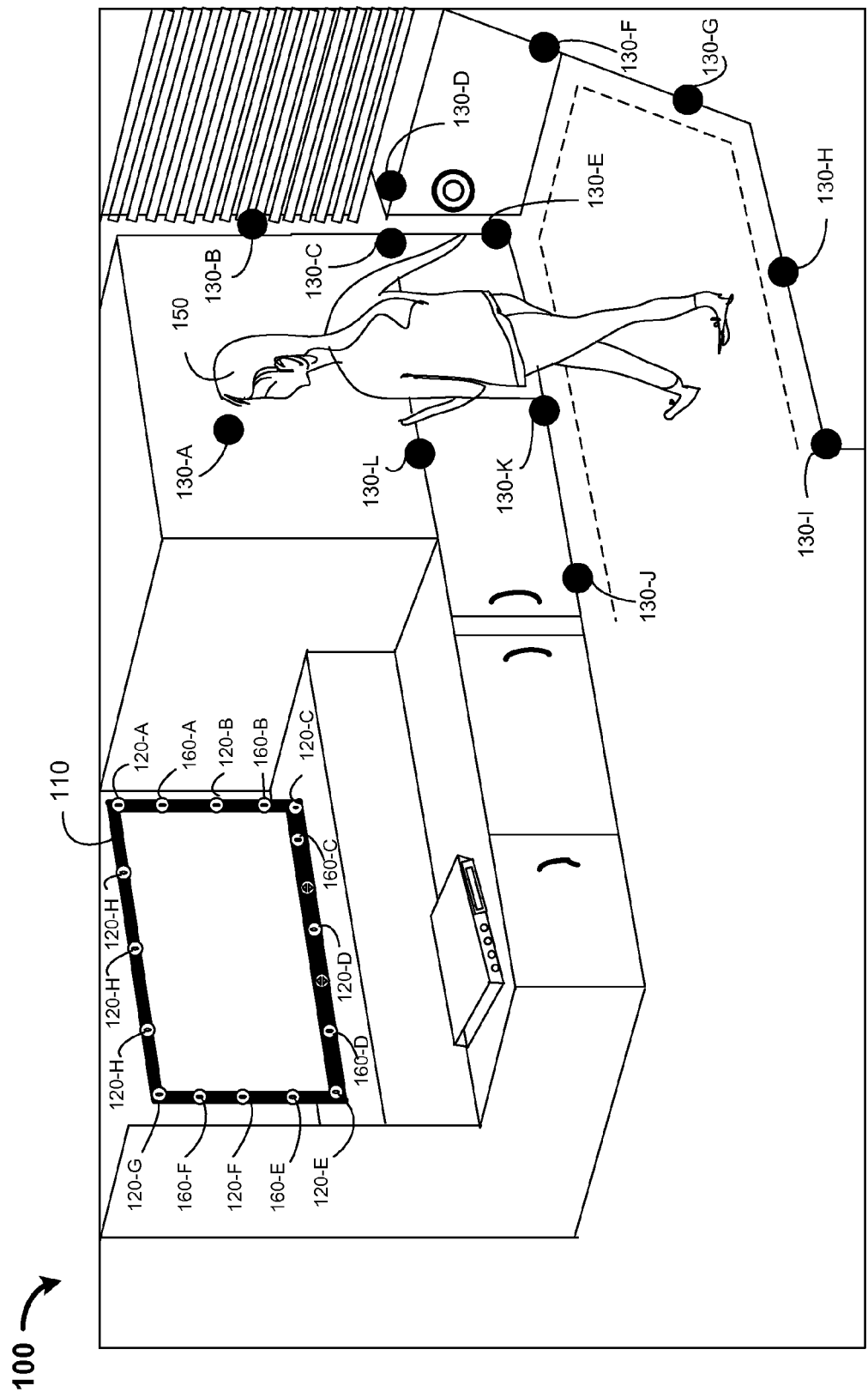
FIG. 1 illustrates an environment 100 in which a gaming system supporting safety features is included in accordance with one embodiment.

The following description describes a gaming system with safety features.

In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, an environment 100 may comprise a gaming system, which may provide safety features in the form of automated indications, for example, to protect the user (or player) from colliding with the surrounding objects that may cause injury is disclosed. In one embodiment, the gaming console may comprise a set of body sensors and proximity sensors. In one embodiment, the body sensors may track the full body movement of the player in 3-dimensional (3D) mode, for example, and store the values as first position values. In one embodiment, the first position values may be used to determine the present position of the player and to predict the next movement of the player as well. In one embodiment, the proximity sensors may perform an initial scan of the surrounding objects and may then track the changes in position of the surrounding objects. In one embodiment, the values generated by the proximity sensors may be stored as second position values.

In one embodiment, the gaming console may determine the proximity vales using the first and the second position values. In one embodiment, the proximity values may represent the closeness of the body parts of the player to the surrounding objects. In one embodiment, the gaming console may compare the proximity values with threshold values and the gaming console may generate a warning signal and pause the game as well if the proximity values are less than or equal to the threshold values. In one embodiment, it may be highly probable that the player may be injured due to collision with the surrounding objects if the proximity values are less than the threshold values. In one embodiment, the gaming console may generate a visual and/or audio warning signal to avoid the player from getting hurt. Also, the player may quickly return to an initial (or safe) state in which the possibility of getting injured by colliding with the surrounding objects is substantially low in response to a pause the game.

An embodiment of an environment 100 comprising a gaming console, which may provide safety features, is illustrated in FIG. 1. In one embodiment, the environment 100 may comprise a gaming console 110, a user 150 (or player) of the gaming console 110, and other surrounding objects. In one embodiment, the surrounding objects may comprise one or more static, movable, and moving portions including the screen of the gaming console 110. For example, the surrounding objects may comprise static portions such as wall cabinets and window panels, moveable portions such as chairs, and moving portions such as other human beings and pets that may walk into the environment 100. In one embodiment, the user 150 may position himself or herself in an action zone (or safe zone) while the game is initiated. However, in one embodiment, the user 150 (or player) may get excited or involved with the game and may forget the surrounding objects and move close to the surrounding objects by moving his body parts such as upper and lower limbs and the head, for example. In one embodiment, if the body parts of the player move into a threshold region 180, the probability of collision of the player with the surrounding objects is higher compared to the player 150 being outside the threshold region 180.

As a result of such undesirable yet inadvertent body movements, the user 150 may collide with the surrounding objects accidently, which may cause injury to the user 150 and may damage the surrounding objects as well. In one embodiment, the probable points in the surrounding environment that the user 150 may collide with is indicated by points 130-A to 130-L. In one embodiment, the points 130-A to 130-L shown in FIG. 1 are representative and the probable points may include many other such points.

In one embodiment, the gaming console 110 may support one or more body sensors 120-A to 120-G and one or more proximity sensors 160-A to 160-F. In one embodiment, the proximity sensors 160 may perform an initial scan of the environment 100 and may store the set of second positional values in a storage medium. In one embodiment, the initial scan may be performed while the user 150 may be initiating a game by selecting a game from a game selection menu. At regular intervals, thereafter, the proximity sensors 160 may scan the surrounding environment and update any changes that the may occur. In one embodiment, the intervals between two scan operations may be very small to provide the safety features in a real-time. In one embodiment, the proximity sensors 160 may comprise RGB cameras, depth sensors, multi-array microphones, and such other similar devices to scan and capture data to generate the second positional values.

In one embodiment, the body sensors 120-A to 120-G may track full body movement of the user 150 by capturing images of the user 150 in a 3 dimensional (3D) mode, for example. In one embodiment, a set of first positional values may be extracted quickly from the captured images before storing the first positional values in a storage device. In one embodiment, the images that capture the full body movement of the user 150 may be captured almost continuously at regular intervals. In one embodiment, the first positional values may be used to predict the next few movements at the least and a probable collision event that may occur in future time point may be predicted. In one embodiment, image captured by the body sensors 120-A to 120-G and the proximity sensors 160 may be processed using edge detection techniques suitable for remote-less game consoles.

In one embodiment, the set of first and second positional values may be used to determine if the user 150 may collide with any of the objects in the surrounding environment. In one embodiment, the gaming console may use the set of first and the second positional values to determine proximity values. In one embodiment, the proximity values may provide information of the degree of closeness of the user 150 with the objects in the surrounding environment. In one embodiment, the user 150 may be provided with a warning signal if the proximity values are within threshold values. In one embodiment, the threshold values may be determined by industry standards or proprietary standards.

Figure 2:
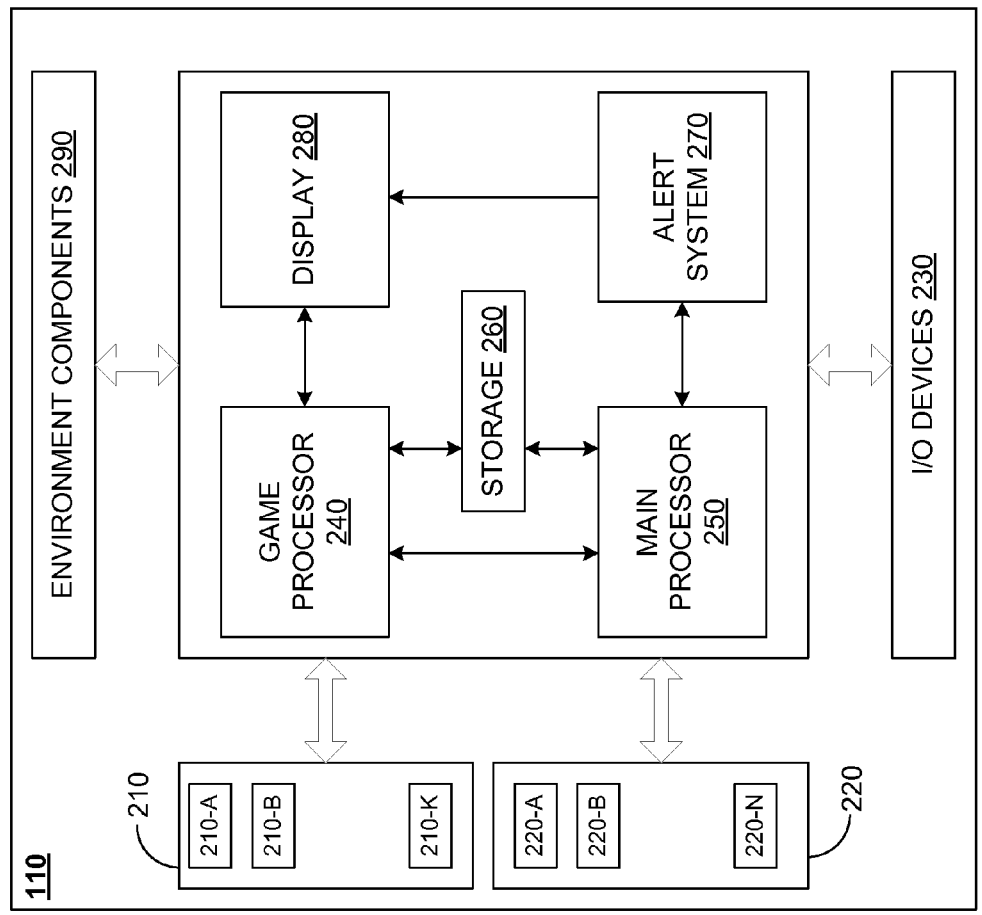
FIG. 2 illustrates a block diagram of a gaming system 200, which may support safety features in accordance with one embodiment.

An embodiment of a gaming console 110, which may provide safety features to the user of the gaming console 110 is illustrated in FIG. 2. In one embodiment, the gaming console 110 may comprise a set of body sensors 210, a set of proximity sensors 220, one or more I/O devices 230, a game processor 240, a main processor 250, a storage device 260, an alert system 270, a display 280, and environment components 290.

In one embodiment, the user 150 may chose a game to play using the I/O devices 230. In one embodiment, the I/O devices 230 may include key board, navigation buttons, switches, displays, transmitters and receivers, and such other similar device. In one embodiment, the I/O devices 230 may include voice recognition devices, which the user may use to initiate, play, and stop the game.

In one embodiment, the proximity sensors 220 may scan and capture the initial images of the surrounding objects while the user may initiate the game. IN one embodiment, the proximity sensors 220 may scan and capture the initial images of the surrounding objects in response to receiving a signal from the main processor 250. In one embodiment, the proximity sensors 220 may then scan and capture the surrounding environment at regular intervals throughout a time period for which the game is played or active. In one embodiment, the proximity sensors 220 may capture the images at regular intervals in response to receiving a capture signal from the main processor 250 at regular intervals. In one embodiment, the proximity sensors 230 may send the captured images to the main processor 250. In one embodiment, the proximity sensors 220 may include RGB cameras, depth sensors, multi-array microphones and such other similar devices.

In one embodiment, the body sensors 210 may track full body movement of the user by capturing images of the user in a 3 dimensional (3D) mode, for example. In one embodiment, the body sensors 210 may capture the body movement of the player at quick intervals to enable safety features to be provided to the user in a real-time. In one embodiment, the body sensors 210 may capture the images of the full body movement of the user almost continuously throughout the duration the game is played. In one embodiment, a RGB camera with depth detection facility may be focused on the user to continuously detect the movement of the user. In one embodiment, the images captured may be provided to the main processor 250 on a real-time basis.

In one embodiment, the game processor 240 may control the game that is selected by the user. In one embodiment, the game processor 240 may receive a game initiation signal from the I/O devices 230 and send a first signal to the main processor 250 to indicate that the game processor 240 is the initial phase of rendering a game on the display 280. In one embodiment, the game processor 240 may retrieve the data from the storage 260 to render the game on the display 280. In one embodiment, the game processor 240 may optimized for accelerating graphics and to perform floating point calculations, which may enhance the efficiency of rendering 3-D games on the display 280.

Also, in one embodiment, the game processor 240 may pause the game in response to receiving a pause signal from the main processor 250. In one embodiment, the game processor 240 may quickly the pause the game and generate a signal to the display 280 that may read "GAME PAUSED". In one embodiment, the game processor 240 may suspend all other activities in response to receiving the pause signal and cause such a signal to be displayed on the screen. In one embodiment, the game processor 240 may receive such a signal as a non-maskable, high-priority interrupt. However, the user may be allowed to continue or restart the game by sending a game resume signal using the I/O devices 230. In one embodiment, the game processor 240 may send a resume signal to the main processor 250 and resume the game as well in response to receiving the game resume signal.

In one embodiment, the main processor 250 may initiate the proximity sensors 220 to scan and capture the surrounding images in response to receiving the first signal from the game processor 240. In one embodiment, the main processor 250 may generate the set of second positional values in response to receiving initial images of the surrounding environment from the proximity sensors 220. In one embodiment, the main processor 250 may store the set of second positional values in a second portion of the storage 260. In one embodiment, the main processor 250 may send capture signals at regular intervals of time and may receive images of the surrounding environment in response. In one embodiment, the main processor 250 may detect changes in the surrounding environment and may store such values as a part of the set of second positional values. In one embodiment, the main processor 250 may use edge detection techniques for object pattern recognition.

In one embodiment, the main processor 250 may initiate the body sensors 210 in response to receiving the first signal. In one embodiment, the main processor 250 may receive the images captured by the body sensors 210 and generate the first set of positional values, which may be stored in a first portion of the storage 260. In one embodiment, the main processor 250 may use the set of first positional values and the set of second positional values to generate the proximity values. In one embodiment, the main processor 250 may determine the difference between the first positional values and the second positional values measured with reference to a common point in the environment 100.

In one embodiment, the main processor 250 may use the difference (or proximity values) to determine the closeness of the body parts of the user (or player) to the surrounding objects. In one embodiment, the main processor 250 may then compare the proximity values with a set of threshold values and if the comparison indicates that the proximity values are within the threshold values the main processor 250 may send a pause signal to the game processor 240 and may generate an alert signal to the alert system 270. In one embodiment, the main processor 250 may generate the pause signal as a non-maskable, high-priority interrupt. In one embodiment, the alert signal may comprise fields to indicate the type of alerting message that is to be delivered to the user. In one embodiment, the alert signal may cause a message in a visual or an audio format or in both visual and audio formats to be conveyed to the user.

In one embodiment, the main processor 250 may use the set of first positional values to predict the next few body movements of the user and a probable collision event that may occur in future time point may be predicted as well. In one embodiment, image captured by the body sensors 210 and the proximity sensors 160 may be processed using edge detection techniques suitable for remote-less game consoles.

In one embodiment, the alert system 270 may generate an alert message in an audio or visual, or both the audio and visual format in response to receiving the alert signal. In one embodiment, the alert system 270 may generate a warning signal, which may read "YOU ARE TOO CLOSE TO AN OBJECT" and may generate audio signals requesting the user to stop moving close to the surrounding objects to alert the user. Such an alerting approach may avoid or minimize the probability of the user being injured due to collision with the surrounding objects.

Figure 3:
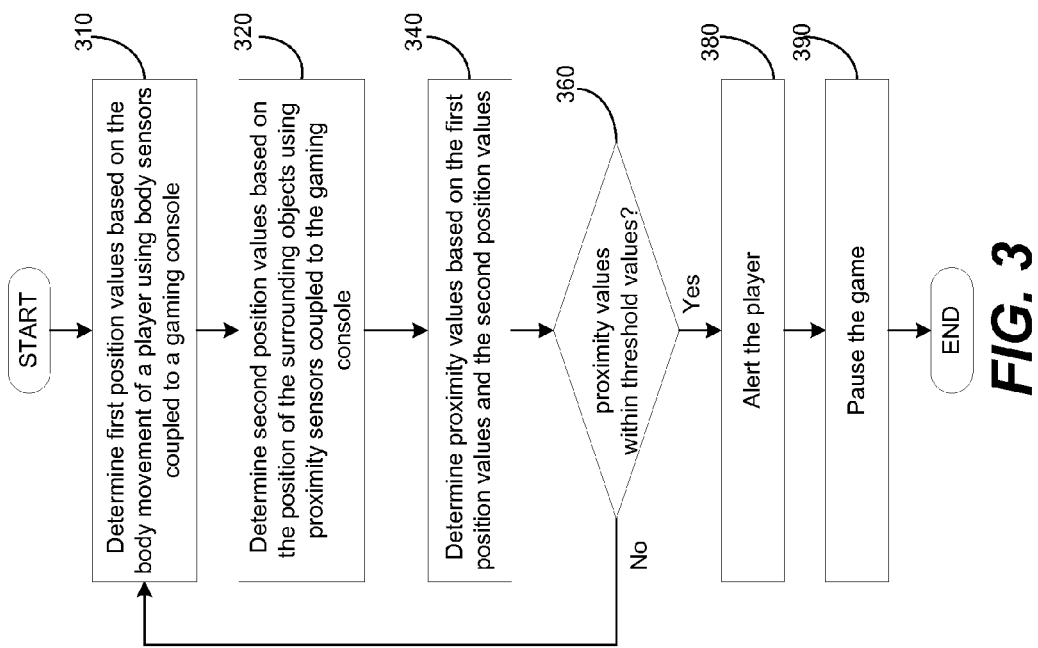
FIG. 3 is a flow-chart, which illustrates an operation performed by the gaming system 200, which provides safety features in accordance with one embodiment.

An embodiment a flow diagram 300 in which the gaming console may provide safety features is illustrated in FIG. 3. In block 310, the main processor 250 may determine the first position values based on the body movement of the player from the images captured using body sensors such as 210 coupled to the gaming console 110.

In block 320, the main processor 250 may determine the second position values based on the position of the surrounding objects using the proximity sensors 220 coupled to the gaming console.

In block 340, the main processor 250 may determine the proximity values based on the first and the second position values. In block 360, the main processor 250 may compare the proximity values with the threshold values to determine if the proximity values are within the threshold values. Control passes to block 380 if the proximity values are within the threshold values and to block 310 otherwise.

In block 380, the main processor 250 may generate an alert signal and send the alert signal to the alert system 270, which may cause the alert messages to displayed or announced to the user. In block 390, the main processor 250 may send a pause signal to the game processor 240 to pause the game.

Figure 4:
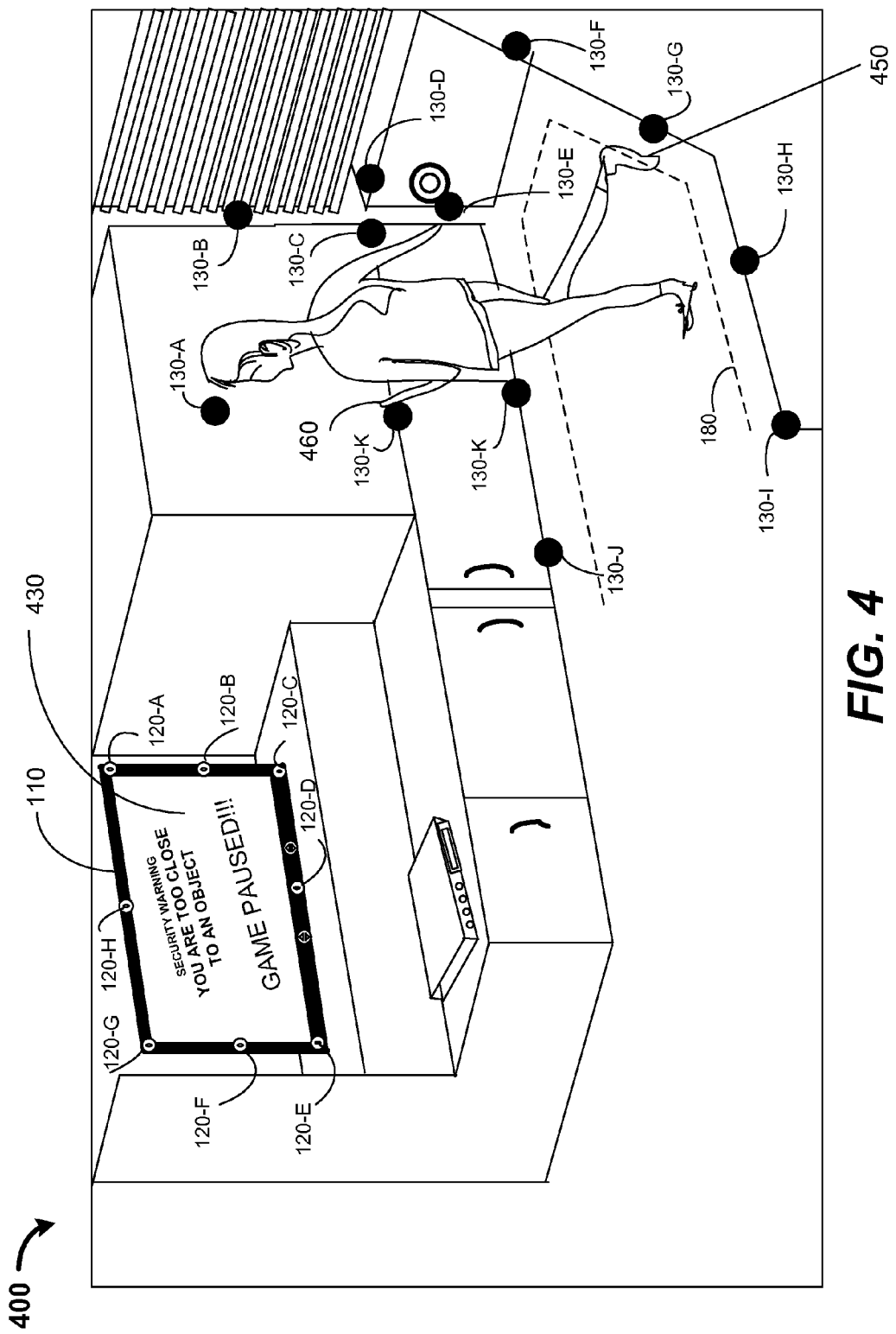
FIG. 4 illustrates the environment 100 in which a gaming system initiates safety features in response to detecting a probable occurrence of hazard in accordance with one embodiment.

An embodiment of the environment 400 comprising a gaming console, which may provide safety features, is illustrated in FIG. 4. In one embodiment, in the environment 100, while playing the game, the user 150 may move the lower limb to a new position 450 which may be within the threshold region 180. However, the new position 450 may be close to hazard point 130-G. In one embodiment, the gaming console 110 may capture the body movement of the player 150 to a new but hazardous position 450 and may generate an alert message 430 displayed on the monitor of the gaming console 110. In one embodiment, the gaming console 110 may detect the movement of the body parts of the user 150 as described above. In one embodiment, the gaming console 110 may detect that the first position values corresponding to the new position 450 may cause the proximity values to be within the threshold values. As a result of the proximity values corresponding to new position 450 being within the threshold values, the gaming console 110 may generate alert signal 430, which may read "YOU ARE TOO CLOSE TO AN OBJECT". Also, in one embodiment, the gaming console 110 may pause the game and a message may be displayed, which may read "GAME PAUSED". As a result of such alert signals and pausing of the game, the probable collision of the user 150 with the surrounding objects may be avoided or at least minimized.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor or as a set of software instructions stored in a machine readable medium.

What is claimed is:

1. A gaming apparatus, comprising:
 a first set of sensors coupled to the gaming apparatus, wherein the first set of sensors are to capture first images of a body movement of a player of game rendered by the gaming apparatus,
 a second set of sensors coupled to the gaming apparatus, wherein the second set of sensors are to capture second images of a plurality of objects surrounding the player, a first processor coupled to the first set of sensors and the second set of the sensors, wherein the first processor is cause a warning message to be displayed if the body movement of the player is within at least one of a plurality of threshold values, wherein the plurality of threshold values specify a threshold region within which a probability of collision of the player with the plurality of objects surrounding the player is higher compared to that outside the threshold region.

2. The gaming apparatus of claim 1, wherein the first set of sensors are to continuously capture the first images of the body movement of the player.

3. The gaming apparatus of claim 2, wherein the first set of sensors include a camera to capture the first images of the body movement of the player.

4. The gaming apparatus of claim 3, wherein the first set of sensors are to include a depth sensor to capture depth value of the first images of the body movement of the player.

5. The gaming apparatus of claim 1, wherein the second set of sensors are to capture the second images of the objects surrounding the player at regular intervals of time.

6. The gaming apparatus of claim 1, wherein the first processor is to determine proximity values based on a plurality of first position values and a plurality of second position values, wherein the plurality of first position values are generated using the first images and the plurality of second position values are generated using the second images.

7. The gaming apparatus of claim 6, wherein the first processor is generate an alert signal and pause signal if the proximity values are within the threshold values.

8. The gaming apparatus of claim 7 further comprises an alert system coupled to the first processor, wherein the alert system is to generate a warning message to the player in response to receiving the alert signal.

9. The gaming apparatus of claim 8, wherein the alert system is to audio or visual warning messages to alert the player.

10. The gaming apparatus of claim 7 further comprises a second processor coupled to the first processor, wherein the second processor is to pause the game in response to receiving the pause signal.

11. A method in a gaming apparatus, comprising:
capturing first images of a body movement of a player of game rendered by the gaming apparatus using a first set of sensors coupled to the gaming apparatus,
capturing second images of a plurality of objects surrounding the player using a second set of sensors coupled to the gaming apparatus,
generating a warning message to be displayed on a display if the body movement of the player is within at least one of a plurality of threshold values,
wherein the plurality of threshold values specify a threshold region within which a probability of collision of the player with the plurality of objects surrounding the player is higher compared to that outside the threshold region.

12. The method of claim 11 comprises capturing the first images of the body movement of the player continuously using the first set of sensors.

13. The method of claim 12, wherein the first set of sensors include a camera to capture the first images of the body movement of the player.

14. The method of claim 3 further includes capturing depth value of the first images using depth sensors, wherein the first set of sensors are to include the depth sensor.

15. The method of claim 11 comprises capturing the second images of the objects surrounding the player at regular intervals of time using the second set of sensors are to capture.

16. The method of claim 11 comprises determining proximity values based on a plurality of first position values and a plurality of second position values, wherein the plurality of first position values are generated using the first images and the plurality of second position values are generated using the second images.

17. The method of claim 16 comprises generating an alert signal and pause signal if the proximity values are within the threshold values.

18. The method of claim 17 further comprises generating a warning message to the player in response to generating the alert signal.

19. The method of claim 18, wherein the warning message to alert the player includes audio or visual signals.

20. The method of claim 17 further comprises pausing the game in response to generating the pause signal.

* * * * *